United States Patent Office 3,092,145
Patented June 4, 1963

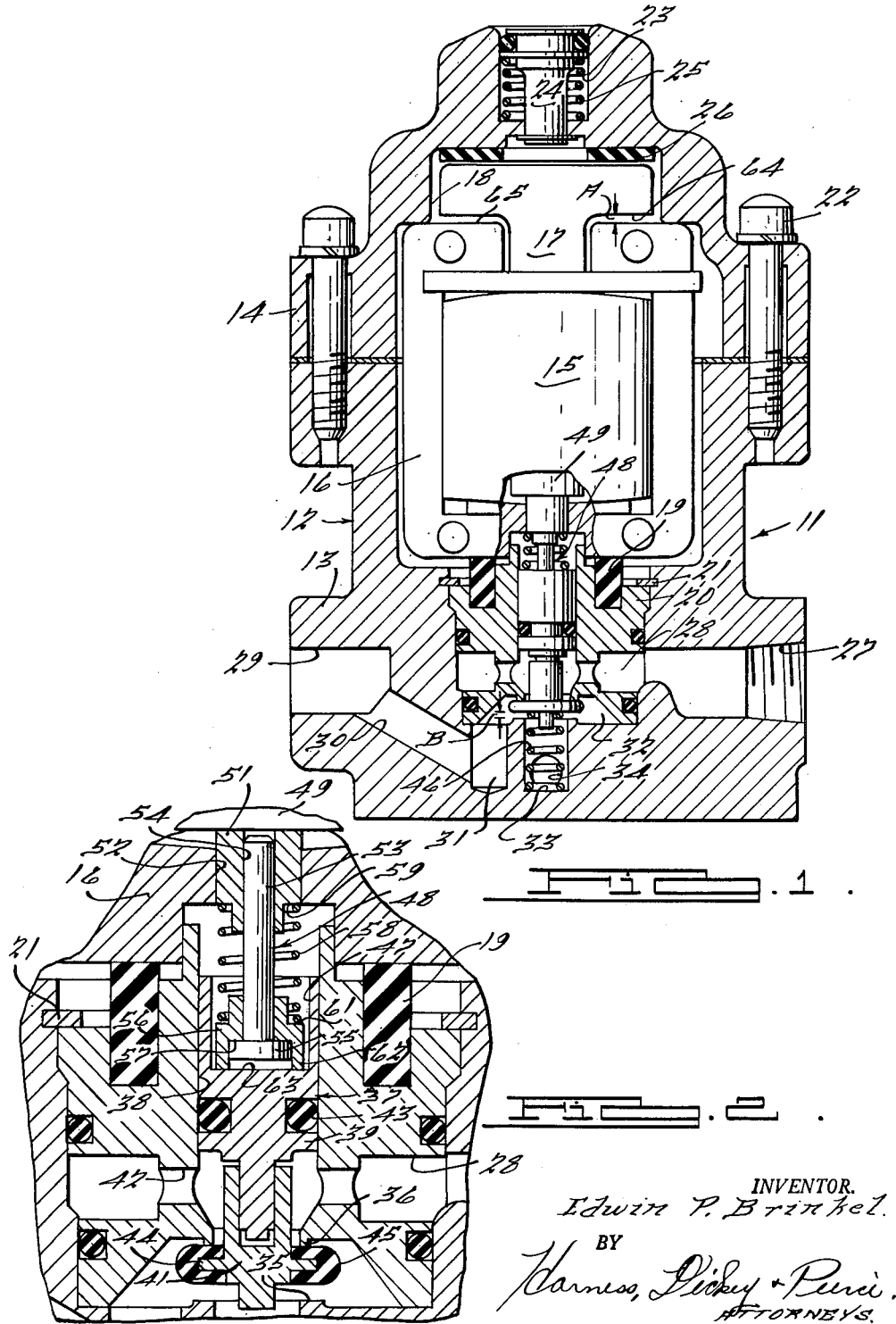

3,092,145
SOLENOID OPERATED VALVE
Edwin P. Brinkel, Royal Oak, Mich., assignor to Ross Operating Valve Company, Detroit, Mich., a corporation of Michigan
Filed Oct. 5, 1959, Ser. No. 844,428
2 Claims. (Cl. 137—625.27)

This invention relates to valves, and more particularly to solenoid operated poppet valves normally spring held in one position and movable by solenoid energization to another position.

It is an object of the invention to provide a novel and improved solenoid operated poppet valve construction which eliminates the need for machining the valve and solenoid components to close tolerances in order to achieve proper valve closure and solenoid armature positioning.

It is another object to provide an improved solenoid operated valve construction of this nature which is especially adapted for use with flat poppet valve seats and thus substantially reduces valve seating alignment problems during fabrication.

It is also an object to provide a novel and improved valve construction having the above characteristics, which permits the stronger or take-up spring in the assembly to be of relatively large diameter, thus greatly contributing to the reliability and life of the assembly.

It is a further object to provide an improved valve construction of this nature in which replacement of parts is greatly facilitated, and which eliminates the necessity of replacing entire sub-assemblies upon failure of a spring.

Other objects, features, and advantages of the present invention will become apparent from the subsequent description, taken in conjunction with the accompanying drawing.

In the drawing:

FIGURE 1 is a partially schematic side elevational view in cross section showing a valve assembly incorporating the improvements of this invention; and FIGURE 2 is an enlarged view of a portion of FIGURE 1.

In general terms, the invention comprises a double faced flat poppet valve having valve seats which control flow from an inlet port to a working or outlet port and from the outlet port to an exhaust port. The poppet valve is spring urged in one direction by a spring engaging one end thereof, and is movable in the opposite direction by a solenoid armature of T-shaped construction, the central portion of the armature being connected to the poppet valve. In valves of this type, it is important that the solenoid armature reach its home position when the solenoid is energized, so as to obtain full solenoid efficiency. It is also necessary that the valve seat properly when the solenoid is energized, and that sufficient stroke be permitted to apply force to the valve against its seat. This must be true even after continued use of the valve assembly which ordinarily results in wear of the solenoid parts and an increase in the armature stroke.

The invention briefly includes a unitary take-up spring construction between the poppet valve and the solenoid armature, this construction comprising a helical compression spring supported at one end by an annular member adjacent the armature and at the other end by a collar which engages a headed member secured to the annular member and passing through the spring. The collar in turn is engageable with the end of the poppet valve opposite that engaged by the first spring. The arrangement is therefore such that energization of the armature will first move the take-up spring unit and poppet valve in unison. After the poppet valve has seated, continued movement of the armature toward its home position will cause slight compression of the take-up spring, the head of the pin moving away from the collar during this movement. Deenergization of the solenoid will permit expansion of the spring until the collar engages the headed pin and then cause movement of the armature, spring unit and poppet valve in unison under the influence of the first-mentioned spring.

Referring more particularly to the drawing, the assembly is generally indicated at 11 and comprises a housing generally indicated at 12 having a lower portion 13 and a cover portion 14. Housing 12 encloses a solenoid 15 having a core 16 of generally U-shaped construction and a T-shaped armature 17 extending through the solenoid coil. Core 16 is engaged at its upper end by a shoulder 18 on the inside of cover 14, the lower end of core 16 engaging an annular compressible rubber washer 19 supported by an insert 20 within housing member 13, this insert being held in place by a snap ring 21. Washer 19 will hold core 16 against shoulder 18 and will serve to lift the solenoid when cover 14 is removed so as to prevent operation of the unit. Bolts 22 serve to hold cover 14 to housing portion 13, and the center of cover 14 has a recess 23 within which is disposed a manual push-button actuator 24 urged upwardly by a spring 25 and movable downwardly to engage the upper end of armature 17 for manual actuation of the valve. A bumper 26 is disposed on the inside of cover 14 immediately above armature 17 to absorb shock during upward movement of the armature.

Housing portion 13 has an inlet port 27 extending through one side thereof and connected with an annular chamber 28 formed in insert member 20. A working port 29 is formed in the opposite side of housing 13 and is connected with an inclined passage 30 leading to a space 31 within the lower portion of housing 13, this space in turn being connected with a recessed portion 32 in the lower end of insert 20. A central bore 33 is formed in the lower end of housing 13, this bore leading to an exhaust port 34. A first valve seat 35 is disposed at the upper end of bore 33, and another annular seat 36 is formed at the lower end of insert 20 in spaced relation with seat 35 and at the inside of recess 32.

A poppet valve generally indicated at 37 is disposed within a bore 38 in insert 20, this poppet valve being fabricated of two parts 39 and 41 having adjacent ends pressed together to form an integral unit. Insert 20 has a plurality of radial passages 42 leading inwardly from annular chamber 28 to bore 38 above seat 36. An annular seal 43 is disposed in a recess in valve member 39 on one side of passages 42, and a radial shoulder 44 having an annular double faced resilient valve seat engaging member 45 is formed on valve member 41 and is disposed between seats 35 and 36. Valve 37 is movable between an upper position and as shown in the figures in which working port 29 is connected to exhaust port 34, and a lower position in which inlet port 27 is connected to working port 29. A helical compression spring 46 is disposed within bore 33, the upper end of this spring being engageable with the underside of valve portion 41 to urge the valve against seat 36.

The upper end of valve member 39 is provided with a relatively wide bore 47. A take-up assembly generally indicated at 48 is engageable at its upper end by the lower end 49 of armature 17 and has a lower portion disposed within bore 47. Take-up assembly 48 comprises a guide 51 slidably disposed within a bore 52 in the lower end of more 16, and a pin 53 pressed into a central bore 54 of guide 51 and extending therebelow. The lower end of pin 53 has a head 55, and a collar 56 is slidably mounted on pin 53 and has a shoulder 57 engageable with head 55. A helical compression spring 58 is disposed between a shoulder 59 on guide 51 and an external shoulder 61 on collar 56. The length of spring 58 is such that it will normally be compressed when shoulder 57 of collar 56 engages head 55 of pin 53. The strength of spring 58 in this compressed condition will be substantially greater than the strength of spring 46. It will be noted that because springs 46 and 58 are not in nested relation, the diameter of spring 58 may be substantially greater than that of spring 46. The lower end 62 of collar 56 is engageable with the bottom 63 of bore 47, the length of collar 56 being such that a substantial space is provided between head 55 of pin 53 and surface 63.

Since it is one of the advantages of the present invention that the need for close correlation between the movements of the solenoid and valve is eliminated, the illustrated embodiment of the invention shows the solenoid travel as being somewhat greater than the valve travel. The movement of the solenoid from its deenergized position to its energized position is indicated by the distance marked A, while the distance of movement of the valve 37 is indicated at B. Distance A is somewhat greater than distance B, so that when the armature arrives at its home position in which the undersurfaces 64 of the armature arms engage the upper surfaces 65 of core 16, member 45 of valve 37 will have engaged seat 35 and will be pressed thereagainst.

In operation of the novel valve construction, assuming an initial condition in which solenoid 15 is deenergized, the parts will be in the position shown in the figures. Spring 46 will urge valve 37 upwardly and will hold member 45 thereof against valve seat 36. Collar 56 will engage head 55 of pin 53, since spring 58 is stronger than spring 46, and guide member 51 will hold solenoid armature 17 in its upper position. In this position, surfaces 64 will be spaced a distance A from surfaces 65 of core 16, this distance being greater than the distance B which is the space between valve member 45 and its seat 35.

When solenoid 15 is energized armature 17 will be attracted downwardly. As this movement occurs, guide member 51 will be moved downwardly within bore 52 of core 16, and since pin 53 is fixed to member 51, this pin will also move downwardly. Spring 58 will tend to compress, but since spring 46 is weaker than spring 58, the latter spring will remain in the position shown in the figures, pushing collar 56 down against valve 37. The valve will move downwardly, compressing spring 46 until valve member 45 engages seat 35. Further movement of valve 37 will cause valve member 45 to be pressed firmly against seat 35. Since surfaces 64 of the armature will at this point still not be engaged with surfaces 65 of core 16, the armature will continue to move downwardly. This will cause continued downward movement of guide 51 and pin 53. However, since collar 56 cannot move downwardly any further, spring 58 will begin to compress, with head 55 of pin 53 moving away from shoulder 57 of collar 56.

This movement will continue until surfaces 64 and 65 are engaged, at which point the solenoid armature will be in its home position with maximum solenoid efficiency. As indicated previously, the space between head 55 and surface 63 of valve 37 is greater than the necessary take-up movement of spring 58.

When the solenoid is deenergized, spring 58 will immediately expand until shoulder 57 of collar 56 engages head 55 of pin 53. Spring 46 will also expand, moving valve 37, take-up unit 48 and solenoid armature 17 upwardly until the position shown in the figures, is reached, with valve member 45 engaging seat 36.

It will thus be seen that a novel and improved take-up construction is provided for solenoid-operated valves which utilizes flat poppet valve seats without alignment problems, and in which maintenance and replacement procedures are greatly simplified. It will be noted, for example, that take-up unit 48 is a separate integral unit which may be easily replaced should spring 58 fail. Spring 46 is also accessible for replacement purposes, since insert 20 may be removed simply by removing snap ring 21.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. In combination, a poppet valve movable between first and second positions, a spring urging said poppet valve toward its first position, a solenoid having an armature energizable to move the poppet valve toward its second position, and an integral take-up unit freely and separably disposed between said armature and poppet valve and comprising a first member disconnected from said armature except for an abutting engagement which permits the armature to urge said first member in only one direction, said first member having a headed pin affixed thereto and extending from one end thereof, a collar surrounding said pin and engaging said head, said collar being disconnected from said valve except for an abutting engagement which permits the valve to urge said collar in a direction opposite to that in which the armature may urge said first member, and a helical compression spring disposed between said member and collar, the length of said take-up unit being such that the travel distance of said armature from its deenergized position to its full home position will be greater than the travel distance of said valve between its two positions.

2. In combination, a poppet valve having a pair of oppositely disposed seat-engaging surfaces, said valve being reciprocable a predetermined distance between first and second positions, a spring engageable with one end of said poppet valve and urging the poppet valve toward one position, a solenoid having an armature attractable in a direction opposite to the urging of said first spring, a separable take-up assembly comprising a helical compression spring, a guide member supporting one end of said spring, a collar supporting the other end of said spring, said take-up assembly being disposed between said armature and the end of said poppet valve opposite the end engaged by said first spring, said guide member and collar being disconnected from said valve and armature except for abutting engagement with the valve and armature which permits the valve to urge the take-up assembly only in one direction and the armature to urge the take-up assembly only in the opposite direction, and means for limiting the separating movement of said guide member and collar comprising a headed pin secured to said guide member and extending through said collar, said collar being slidable on said pin and engageable with the head of said pin.

References Cited in the file of this patent

UNITED STATES PATENTS

| | | |
|---|---|---|
| 906,331 | Struble | Dec. 8, 1908 |
| 2,539,913 | Koepcke | Jan. 30, 1951 |
| 2,658,523 | Johnson | Nov. 10, 1953 |
| 2,682,386 | Lindsay | June 29, 1954 |
| 2,761,470 | Batts | Sept. 4, 1956 |
| 2,812,776 | Lofftus | Nov. 12, 1957 |
| 2,867,236 | Klein | Jan. 6, 1959 |
| 2,872,149 | Battey | Feb. 3, 1959 |
| 2,881,796 | Garraway | Apr. 14, 1959 |
| 2,895,089 | Leber | July 14, 1959 |